(No Model.) 6 Sheets—Sheet 1.
P. F. HOLMGREN.
DRAWING PRESS.
No. 562,360. Patented June 16, 1896.
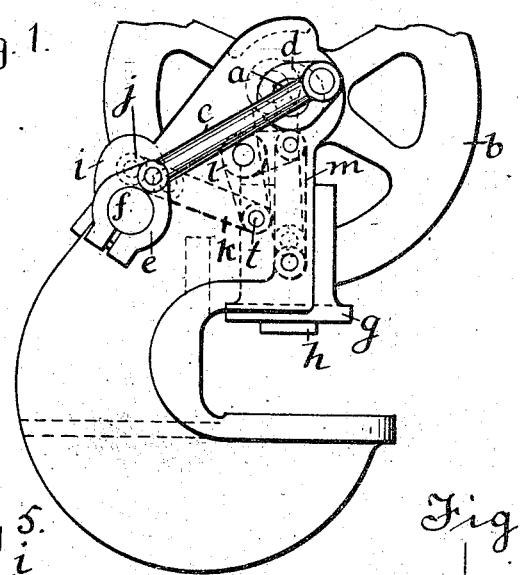
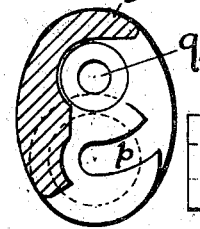
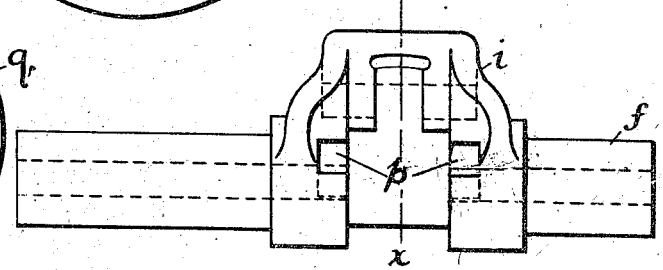
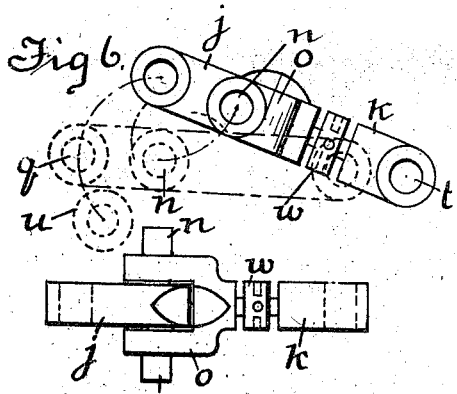
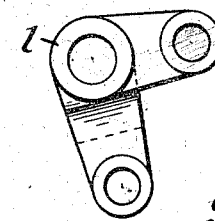
Witnesses
Inventor
Per F. Holmgren
By H P Thayer
atty (No Model.) 6 Sheets—Sheet 2.
P. F. HOLMGREN.
DRAWING PRESS.
No. 562,360. Patented June 16, 1896.
Fig. 1ª.
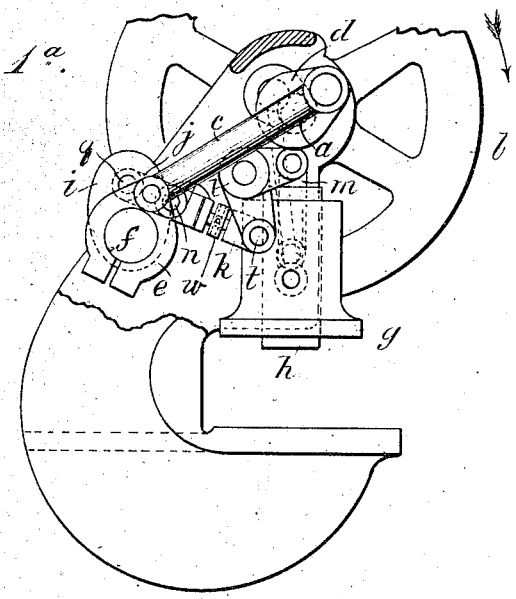
Fig. 2ª.
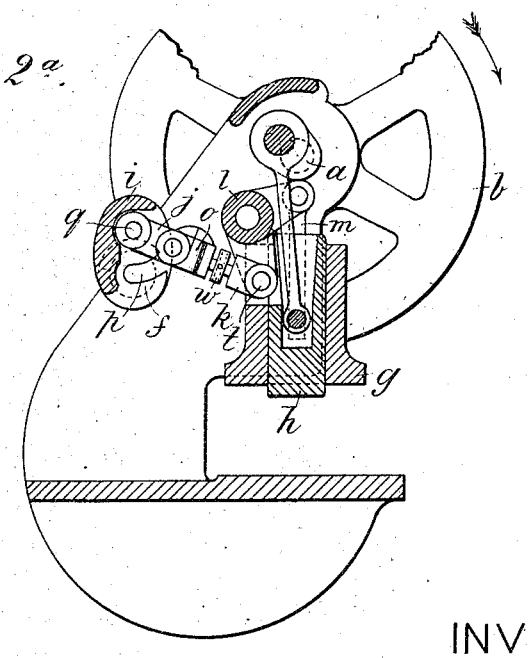
WITNESSES.
Ernst Lundgren
INVENTOR.
Per F. Holmgren
By A. P. Thayer (No Model.)  
P. F. HOLMGREN.  
DRAWING PRESS.  
No. 562,360.  
Patented June 16, 1896.

6 Sheets—Sheet 3.

Witnesses.  
Inventor.  
Per F. Holmgren  
By A. P. Thayer (No Model.)

P. F. HOLMGREN.
DRAWING PRESS.

No. 562,360. Patented June 16, 1896.

Witnesses.
Inventor.
Per F. Holmgren
By N. P. Thayer
atty.

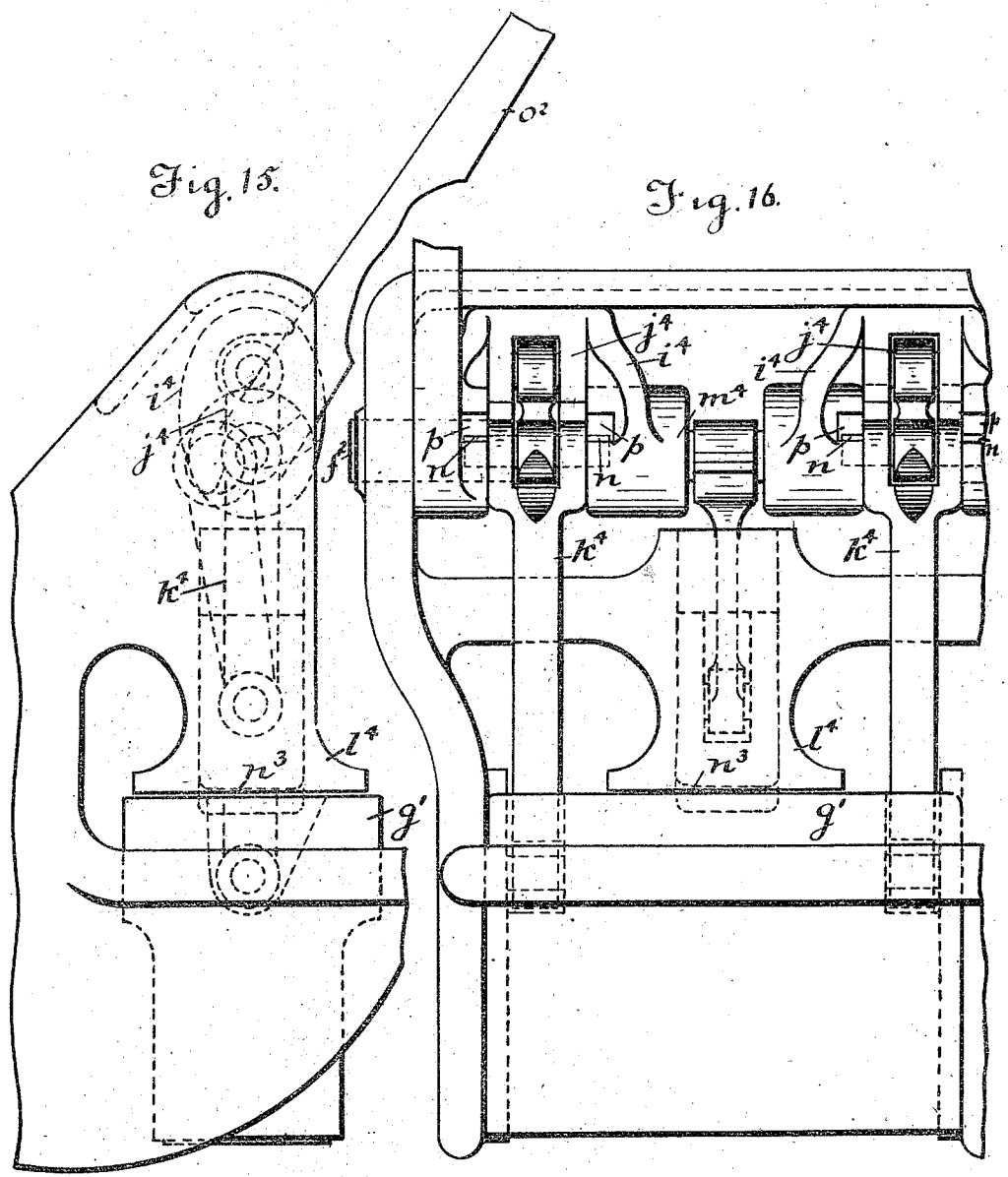

(No Model.) 6 Sheets—Sheet 6.
P. F. HOLMGREN.
DRAWING PRESS.

No. 562,360. Patented June 16, 1896.

Witnesses.
Ernst Lundgren

INVENTOR
Per F. Holmgren
BY
A. P. Thayer
ATTORNEY

UNITED STATES PATENT OFFICE.

PER F. HOLMGREN, OF BROOKLYN, NEW YORK.

DRAWING-PRESS.

SPECIFICATION forming part of Letters Patent No. 562,360, dated June 16, 1896.

Application filed April 11, 1895. Serial No. 545,294. (No model.)

*To all whom it may concern:*

Be it known that I, PER F. HOLMGREN, a citizen of the United States, and a resident of Brooklyn, in the county of Kings and State of New York, have invented certain new and useful Improvements in Drawing-Presses, of which the following is a specification.

My invention relates to means for causing the dwell or rest of the blank-holder while holding the blank and is designed to provide for more positive and unvarying dwell, and for simpler and better apparatus for actuating the blank-holder, said apparatus being also useful for other purposes, as for working an intermittently-reciprocating device, as a feeder for a press or the like, as hereinafter described, reference being made to the accompanying drawings, in which—

Figure 2:
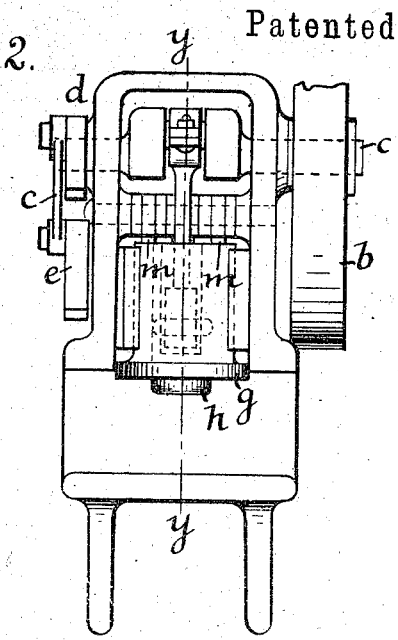
Figure 10:
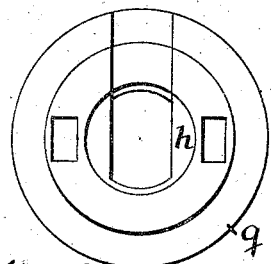
Figure 11:
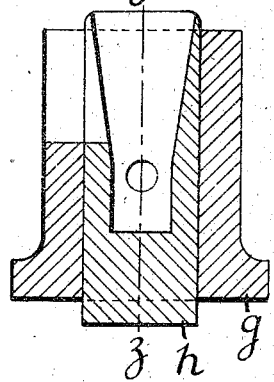
Figure 3:
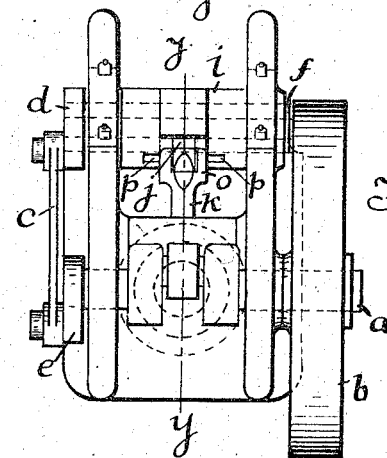
Figure 12:
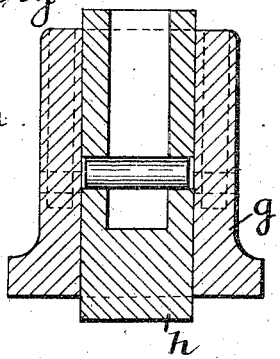
Figure 13:
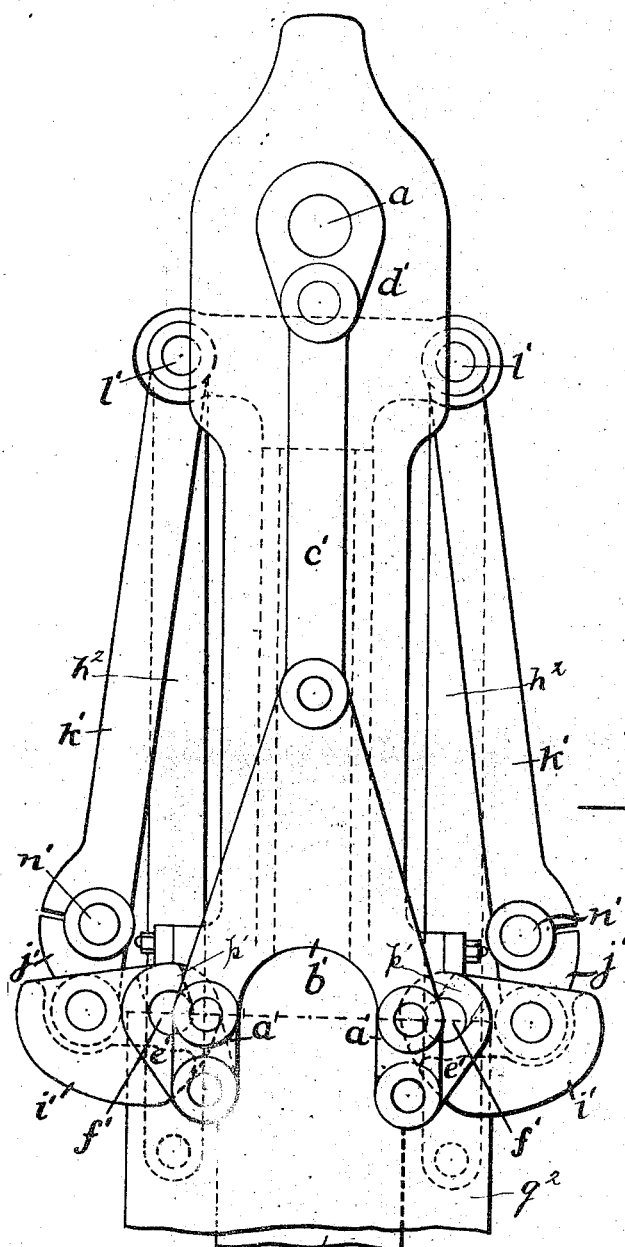
Figure 14:
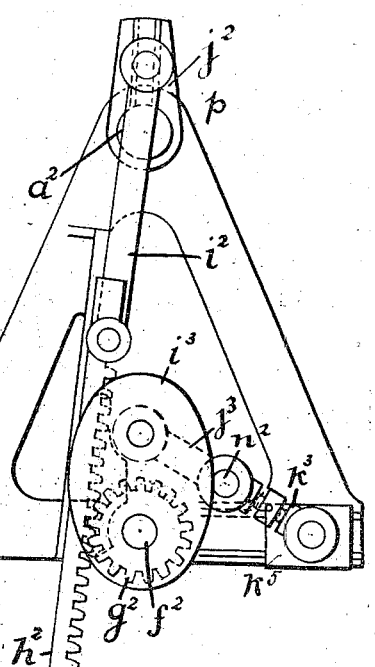
Figure 17:
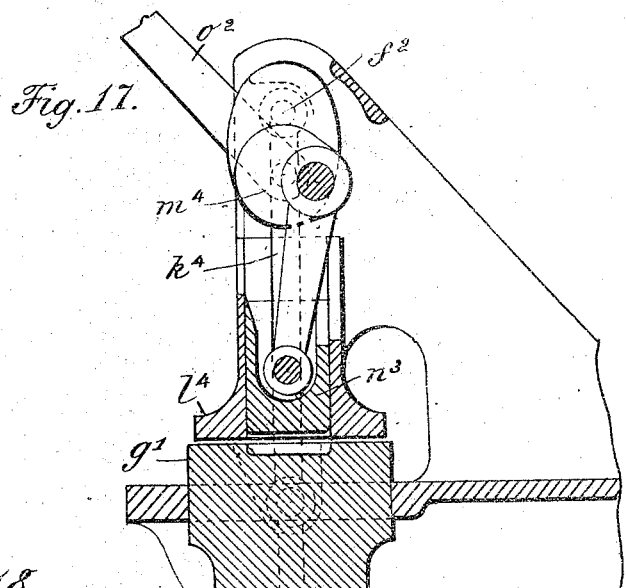
Figure 18:
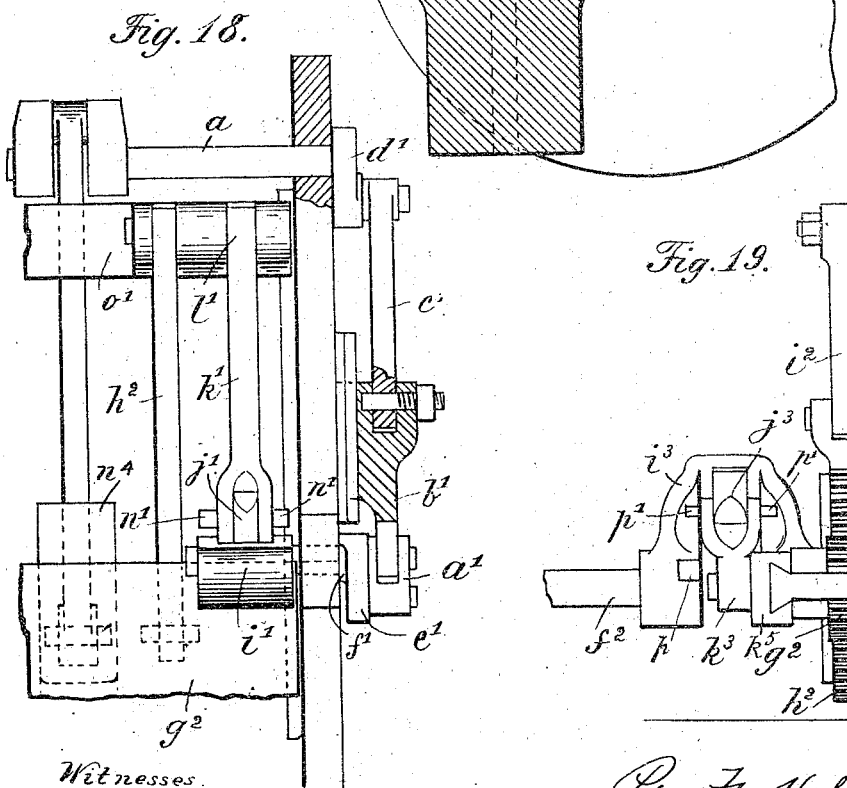
Figure 19:
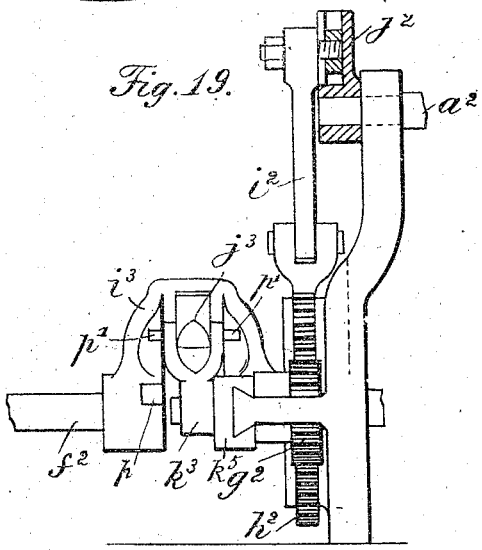

Figure 1 is a side elevation of my improved drawing-press. Fig. 1$^a$ is a side elevation with part of the housing detached. Fig. 2 is a front elevation. Fig. 2$^a$ is a sectional elevation on line $y$ $y$, Figs. 2 and 3. Fig. 3 is a top or plan view. Fig. 4 is a side elevation of the rock-shaft for working the blank-holder. Fig. 5 is a transverse section of the said rock-shaft on the line $x$ $x$. Fig. 6 is a side elevation of the jointed connecting-rod by which motion is transmitted from the rock-shaft to the blank-holder and the dwell of the blank-holder is effected, with dotted lines indicating the operations. Fig. 7 is a plan view of the said jointed connecting-rod. Fig. 8 is a top view of a bell-crank by which said jointed connecting-rod is coupled with the blank-holder. Fig. 9 is a side elevation of said bell-crank. Fig. 10 is a top view of the blank-holder and drawing-punch. Fig. 11 is a sectional elevation of the blank-holder and drawing-punch on the line $y$ $y$ of Fig. 3. Fig. 12 is a sectional elevation of the blank-holder and punch on the line $z$ $z$ of Fig. 11. Fig. 13 is a side elevation of duplex apparatus for actuating the blank-holder better adapted for large presses; and Fig. 14 is a side elevation of apparatus, illustrating the application of the blank-holder-actuating mechanism for an intermittent feeder suitable for stamping-presses and other machines. Fig. 15 is an elevation of a drawing-press having my improved blank-holder-actuating apparatus and being organized so that both the blank-holder and the drawing-punch are operated by the rock-shaft, which is an economical feature of the improvement. Fig. 16 is a front elevation of the apparatus of Fig. 15. Fig. 17 is a sectional elevation of the apparatus represented in Figs. 15 and 16, the section being taken transversely to the crank-shaft at the middle or thereabout of the front view in Fig. 16. Fig. 18 is a front view of part of the machine represented in side view in Fig. 13 with some parts in section, and Fig. 19 is a front elevation of the apparatus of Fig. 14 with a part in section. Figs. 1, 2, and 3 are drawn to a smaller scale than the rest.

The main shaft $a$, to which the power is applied by a pulley $b$, is coupled by a rod $c$ and cranks $d$ $e$ to the rock-shaft $f$ parallel to shaft $a$, but lower and back of the vertical plane of the driving-shaft, in which the blank-holder $g$ and the drawing-punch $h$ are located; but the rock-shaft may have any other approved means of operating it, as the lever in Figs. 15, 16, and 17. This rock-shaft has a crank $i$ in the central plane $y$ $y$ of the machine, from which motion is transmitted to the blank-holder $g$ by the knuckle-jointed connecting-rod $j$ $k$, bell-crank $l$, and the links $m$. The rock-shaft may however be placed higher or in any suitable location. This connecting-rod, composed of the said two parts $j$ $k$, is coupled by a knuckle-joint allowing it to articulate in one direction but positively limiting it against flexure in the opposite direction. The pivot $n$ of this joint projects at one or both ends beyond the sides of the fork $o$ of the connecting-rod and the crank $i$ has a channel or channels $p$, admitting said projection to the axis of the rock-shaft, where they lodge and then serve as the pivot of part $j$ of the connecting-rod when in the course of the down movement of the blank-holder the wrist-pin $q$, said axis, and the pivot $t$ of the other extremity of the connecting-rod come into a right line, as indicated by the dotted lines in Fig. 6, which is timed to occur at the moment the blank-holder reaches the right point in relation to the blank and the die for holding it. Then the part $j$ of the connecting-rod swings with the crank $i$ during the rest of the forward movement of the rock-shaft and during its return to the said right line, as indicated by dotted lines $u$ in Fig. 6, during which time the blank-holder rests and is positively and unvaryingly held in position. One of the parts of this connecting-rod, as $k$, is made extensible by the swivel-screw $w$, or other approved means to adjust the parts with exactness.

Two links $m$ are employed in connecting the bell-crank $l$ and the blank-holder at opposite sides of the drawing-punch which works in the center of said holder and to have better control for causing the blank-holder to seat fairly on the blank, which is important in view of the large area of the face of the blank-holder, which demands great nicety of adjustment.

The bed-die, which is to be of the common form and will be located on the supporting bed-plate, as usual in such machines, is not shown in the drawings, as it forms no part of the invention claimed.

For large presses it is desirable to duplicate the blank-holder-actuating devices for distributing the stresses, and for greater ease of operation, which may be carried out in various arrangements, one of which I have represented in Figs. 13 and 18, wherein two rock-shafts $f'$ and cranks $i'$ are employed on opposite sides of the vertical plane of the crank-shaft, with two connecting-rods, as $j'k'$, which may be connected at $l'$ with the cross-head $o'$, connected to the blank-holder $q^2$ by any approved means, as links $h^2$. The drawing-punch $n^1$ is connected to crank-shaft $a$, as in the other arrangements. The cranks $e'$ of these rock-shafts are connected by links $a'$ with a yoke $b'$, coupled by connecting-rod $c'$ with the crank $d'$ of the main driving-shaft. The connecting-rods $j'k'$ have like knuckle-joints and the rock-shaft cranks have corresponding channels $p'$, (dotted Fig. 13,) admitting the extension-pivots $n'$ to the axis of the rock-shafts for articulation of the joints while the blank-holder is at rest.

In Figs. 14 and 19 I represent an arrangement whereby the same articulating connecting-rod and rock-shaft may be employed for operating a reciprocating device, as the slider $k^3$, which may be utilized as an intermittent feeder, as for feeding blanks to a press and the like where a long dwell of the feeder is required. In this case the rock-shaft $f^2$ is represented as geared by a toothed pinion $g^2$ with a reciprocating toothed rack $h^2$, connected by rod $i^3$ with the crank $j^3$ of the main shaft $a^2$ suitably for being rocked forward and backward, and the jointed connecting-rod $j^3$, $k^3$ is connected with the crank $i^3$ of said rock-shaft, said crank having like channels $p$, and the connecting-rod having like pivot extensions $n^2$ for lodging in the axis of the crank-shaft and interrupting the transmission of motion by the connecting-rod. It will be seen that with this improved apparatus of my invention it is feasible to cause the dwell of the blank-holder during nearly a half-revolution of the punch-driving shaft, and to vary it to any desired limit of less extent.

In Figs. 15, 16, and 17 I represent a simple and economical construction of presses in which it is made feasible by my invention to utilize the rock-shaft for working both the blank-holder and the drawing-punch. In this case the blank-holder $g'$ is suspended directly from the rock-shaft $f^2$ by a pair of knuckle-jointed connecting-rods $j^1 k^1$, or it may be by one only, and cranks $i'$, and preferably so that it works upwardly against a stationary bed-die, whereon it comes to rest with the blank upon its upper face when the cranks from which it is suspended pass the upper center, and the drawing-punch $n^3$ is geared with an intermediate crank $m^1$ of the rock-shaft, the same as in the other plans, said crank being set in suitable relation to the others for the punch to take effect on the blank, when the blank-holder comes to rest or immediately thereafter, and draw it downward in the bore of the blank-holder, which is in this case the drawing-die.

The rock-shaft may be worked by a hand-lever, as $o^2$, in the case of small presses, or it may be geared by a crank and connecting-rod with a rotary driving-shaft, as in Fig. 1.

I claim as my invention—

1. The combination of the rock-shaft having a crank, a knuckle-jointed rod connected with the crank, and means to cause the pivot of the knuckle-joint to lodge and rest in the axis of the rock-shaft and maintain one portion of the rod at rest during the further movement of the other portion with the crank substantially as described.

2. The combination of the rock-shaft, the crank of said rock-shaft having the lateral channel or channels into the axis of the rock-shaft and the knuckle-jointed connecting-rod having a pivot extension or extensions of the knuckle-joint adapted to enter said channel or channels and lodge in the axis of the shaft to permit one portion of the rod to rest during further swing of the other portion of said rod with the crank substantially as described.

3. The combination of the rock-shaft, the crank of said shaft having the lateral channel or channels into the axis of the rock-shaft, and the knuckle-jointed connecting-rod one part of which is of equal length with the crank, and said joint has a pivot extension or extensions adapted to enter said channel or channels and lodge in the axis of the shaft to permit one portion of the rod to rest during the further movement of the other portion of said rod with the crank substantially as described.

4. The combination of the rock-shaft having a crank, a knuckle-jointed rod connected with the crank, means to cause the pivot of the knuckle-joint to lodge and rest in the axis of the rock-shaft and maintain one portion of the rod at rest during further movement of the other portion with the crank, a blank-holder coupled with the resting part of the connecting-rod, and a drawing-punch coacting with the blank-holder.

5. In a drawing-press the combination with the blank-holder, of a rock-shaft, the crank of said shaft having a lateral channel or channels into the axis of the rock-shaft, and the knuckle-jointed connecting-rod coupled with said crank and the blank-holder, and having a pivot extension or extensions of the knuckle-joint adapted to enter said channel or channels and lodge in the axis of the shaft to permit one portion of the rod to rest and maintain the blank-holder at rest while the other portion of said rod has further movement with the crank substantially as described.

6. In a drawing-press, the combination with the blank-holder, of a rock-shaft, the crank of said shaft having a lateral channel or channels into the axis of the rock-shaft, the knuckle-jointed connecting-rod coupled with said crank, and the bell-crank coupled with said connecting-rod and the blank-holder, and having a pivot extension or extensions of the knuckle-joint adapted to enter said channel or channels and lodge in the axis of the shaft to permit one portion of the connecting-rod to rest and maintain the blank-holder at rest while the other portion of said rod has further movement with the crank substantially as described.

7. In a drawing-press the combination of a rock-shaft having a crank, a blank-holder, a knuckle-jointed rod connecting said blank-holder with the crank, means to cause the pivot of the knuckle-joint of said rod to lodge and rest in the axis of the crank-shaft and maintain the blank-holder at rest during part of the movement of the crank, and a drawing-punch, also connected to a crank of said rock-shaft and timed with relation to the blank-holder for taking effect on the blank while the blank-holder is at rest substantially as described.

8. In a drawing-press, the combination of the rock-shaft, a blank-holder, one or more knuckle-jointed connecting-rods suspending the blank-holder from one or more cranks, of said rock-shaft, means to cause the pivot or pivots of said connecting rod or rods to lodge in the axis of the crank-shaft and maintain the blank-holder at rest during part of the movement of the crank or cranks, a stationary die located over the blank-holder, and a drawing-punch also connected to a crank of said shaft and timed with relation to the blank-holder for taking effect on the blank while the blank-holder is at rest substantially as described.

Signed at New York city, in the county and State of New York, this 28th day of February, A. D. 1895.

PER F. HOLMGREN.

Witnesses:
W. J. MORGAN,
F. A. THAYER.